Feb. 16, 1932.  A. H. ELLIS  1,844,948

AUTOMOBILE SIGNAL

Filed May 12, 1931  2 Sheets-Sheet 1

Witness
H. Woodard

Inventor
Arthur H. Ellis
By H. B. Willson &co
Attorneys

Feb. 16, 1932.  A. H. ELLIS  1,844,948
AUTOMOBILE SIGNAL
Filed May 12, 1931   2 Sheets-Sheet 2
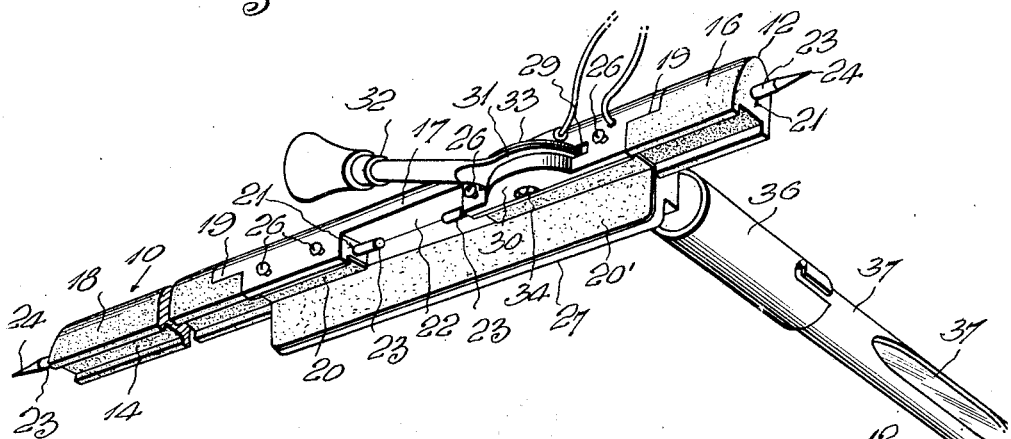
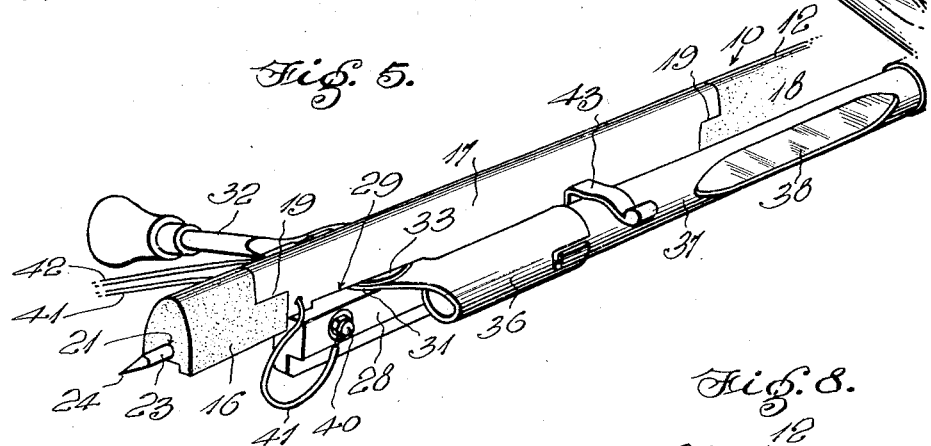
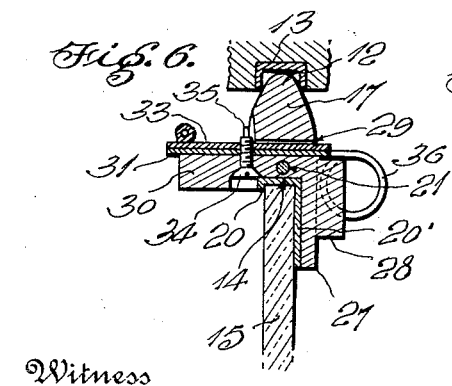
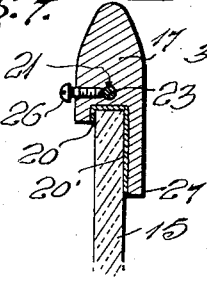
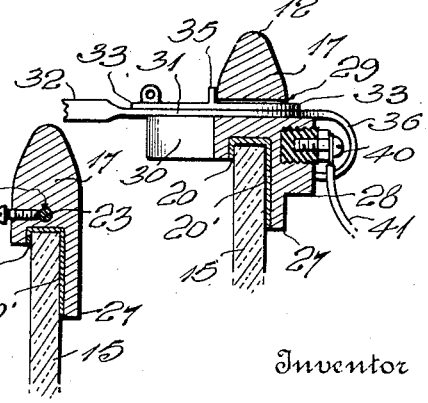
Inventor
Arthur H. Ellis
By H. B. Willsoutes
Attorneys.
Witness
H. Woodard Patented Feb. 16, 1932

1,844,948

UNITED STATES PATENT OFFICE

ARTHUR H. ELLIS, OF ROCHESTER, MINNESOTA, ASSIGNOR OF ONE-HALF TO ROCHESTER APPLIANCE COMPANY, OF ROCHESTER, MINNESOTA

AUTOMOBILE SIGNAL

Application filed May 12, 1931. Serial No. 536,908.

The invention relates to improvements in signals adapted for mounting upon automobiles to indicate to the drivers of other machines and to pedestrians, when a turn is to be made, and it is the object of said invention to provide an exceptionally simple and inexpensive, yet an unusually desirable signal which may be quickly and easily mounted in the upper portion of an automobile window frame, will not interfere with closing of the window glass, and may be conveniently operated whenever desired, and while the primary intent is to indicate when turns are to be made, it is of course possible to provide for using the device as a stop signal also, if desired.

With the foregoing in view, the invention resides in the novel subject matter hereinafter described and claimed, the description being accomplished by reference to the accompanying drawings.

Figs. 4 and 5 are perspective views looking in different directions.

Fig. 6 is a transverse sectional view on line 6—6 of Fig. 2.

Fig. 7 is a detailed transverse section on line 7—7 of Fig. 3.

Fig. 8 is a transverse section on line 8—8 of Fig. 2.

The construction selected for illustration, will be rather specifically described with the understanding however, that within the scope of the invention as claimed, variations may be made.

Figure 1:
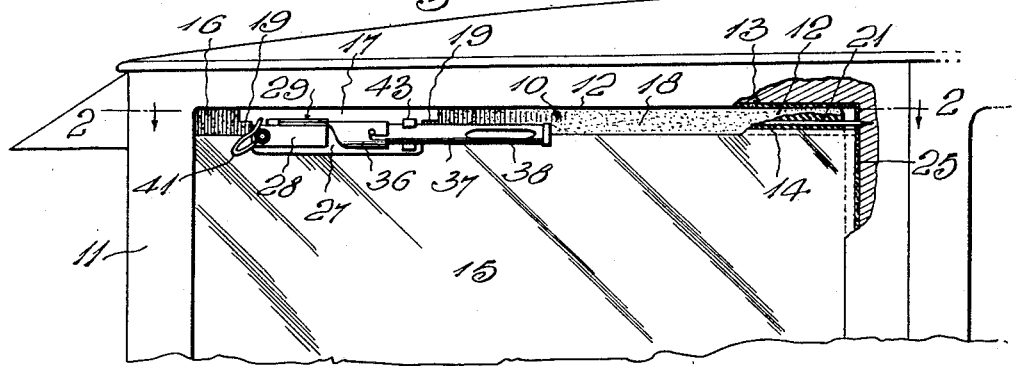
Fig. 1 is an outer side elevation partly in section showing the signal applied.
Figure 2:
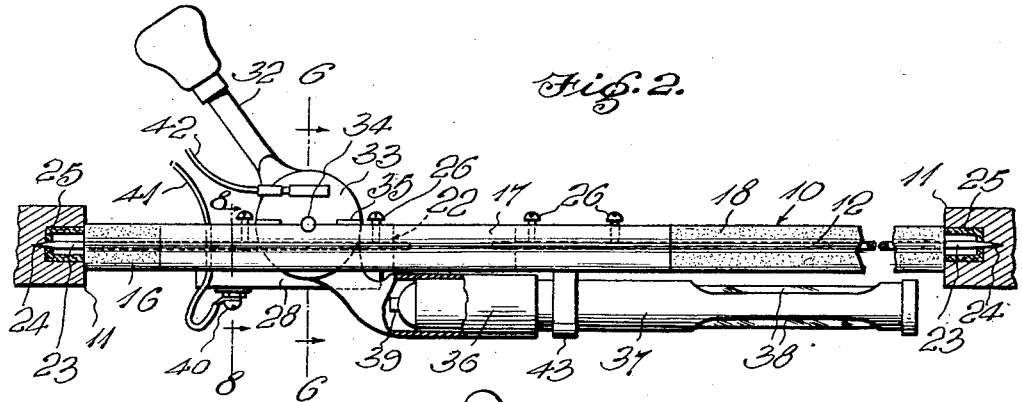
Fig. 2 is a horizontal sectional view on line 2—2 of Fig. 1, the signal being in its retracted position.
Figure 3:
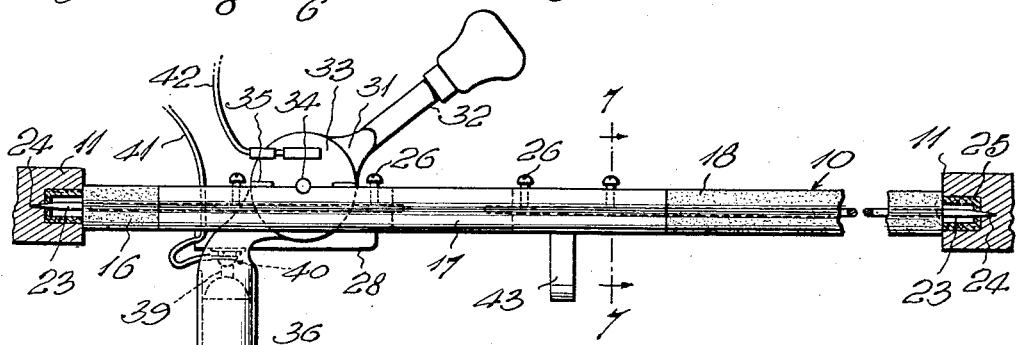
Fig. 3 is a view similar to Fig. 2 but illustrating the signal extended.

The device embodies a horizontally elongated bar-like support 10 adapted to extend from the front to the rear of an automobile window frame 11, as seen in Figs. 1, 2 and 3, said support 10 being provided with a straight relatively narrow upper edge 12 for reception in the uppermost window-receiving groove 13 of said frame 11, and having a comparatively wide straight lower edge which is formed with a longitudinal groove 14 to receive the upper end of the glass window 15.

The support 10 is formed from three longitudinal sections 16, 17 and 18 which abut each other and are preferably stepped at 19 at their abutting ends to prevent relative turning of said sections. The intermediate section 17 is formed from wood, metal or other relatively rigid material, whereas the sections 16 and 18 are preferably formed from rubber or some analogous material, so that the window 15 may snugly engage them in an anti-rattling manner. The grooved portion of the section 17 which engages the window may be lined with felt or the like 20 to prevent rattling, and obviously, snug contact between the window and the entire grooved lower edge of the support 10, will prevent entrance of cold air into the machine.

The three sections 16, 17 and 18 of the support 10 are formed with alined longitudinal bores 21, and the section 17 is provided between its ends with a recess 22 into which its bores open. These bores slidably receive two anchoring rods 23 whose outer ends 24 are pointed and whose inner ends are received in the recess 22. When the support 10 is in position, by engaging a suitable tool with the inner end of the rods 23, they may be forced outwardly so that their pointed ends 24 will penetrate the bottoms of the vertical window-guiding grooves 25 of the frame 11, and to hold the rods in their operative positions, set screws 26 are threaded into the support section 17 to abut said rods.

In the construction shown, the outer side portion of the central support section 17 is provided with a longitudinal downwardly projecting flange 27 to lie against the outer side of the window 15 when the latter is raised, and the felt or the like 20 may be extended over the inner side of this flange as denoted at 20'. The outer side of the flange 27 is provided with a thickening rib 28 which is immediately below a horizontal slot 29 which is formed through the aforesaid section 17. Immediately below this slot, the inner side of the support section 17 is provided with a horizontal lug 30. The flat intermediate portion 31 of a hand lever 32, passes through the slot 29, rests frictionally upon the bottom of this slot, and rests similarly upon the rib 28 and lug 30. A friction washer 33 lies upon the lever portion 31, and a pivot screw 34 passes through the parts 30, 31 and 32 to pivotally mount the lever 32 and to provide a frictional joint. To hold the plate 33 against turning about the screw 34, said plate is provided with lugs 35 abutting the support section 17. The outer end of the lever 32 carries an appropriate socket 36 with which a signal arm 37 is engaged. This arm embodies light-pervious portions 38 which are preferably colored, an illuminating bulb (not shown) for said portions 38, and a contact 39 which is instrumental in completing the circuit of the bulb when the arm 37 is extended as seen in Figs. 3 and 4. When the arm is in this position, the contact 39 abuts a stationary contact 40 which is carried by and insulated from the support section 17. One current-conducting wire 41 is connected with this contact and the other wire 42 is connected with the friction plate 33. Whenever the arm is swung outwardly, the contact 39 engages the contact 40 to complete the circuit of the signal arm bulb, and when said arm is swung back to its normal position, the circuit is broken. A suitable clip or spring arm 43 may be employed for holding the arm in its normal retracted position, and said clip or arm will readily yield and allow the operator to swing the lever 32 for the purpose of extending the signal arm whenever desired.

It will be seen from the foregoing that novel and advantageous provision has been made for carrying out the object of the invention, but attention is again invited to the fact that variations may be made within the scope of said invention as claimed.

I claim:—

1. In a closed car turning signal, a horizontal bar-like support adapted to extend from the front to the rear of an automobile window frame, said support having a straight upper edge to engage the upper part of the frame and a straight lower edge to abut the upper end of the window, anchoring prongs on the ends of said support adapted to penetrate the bottoms of the vertical window-guiding grooves, and a signal member mounted on said support.

2. In a closed car turning signal, a horizontal bar-like support adapted to extend from the front to the rear of an automobile window frame, said support having a straight upper edge to engage the upper part of the frame and a straight lower edge to abut the upper end of the window, said support comprising a plurality of abutting longitudinal sections one of which is rigid and at least one of which is flexible, said flexible section having a longitudinal bore, an anchoring rod slidably received in said bore and having an outer end adapted to engage one of the vertical window-guiding grooves of the frame, an anchoring member on the other end of the support adapted to engage the other vertical window-guiding groove, means for securing said rod to said rigid support section when the two are relatively adjusted to anchor the support, and a signal member mounted on said rigid support section.

3. In a closed car turning signal, a horizontal bar-like support adapted to extend from the front to the rear of an automobile window frame, said support having a straight upper edge to engage the upper part of the frame and a straight lower edge to abut the upper end of the window, said support comprising three abutting longitudinal sections, the intermediate section being rigid and the others flexible, said flexible sections having longitudinal bores, anchoring rods slidably received in said bores and having outer ends adapted to engage the vertical window-guiding grooves of the frame, means for securing said rods to said rigid support section after relative adjustment thereof to anchor the support, and a signal member mounted on said rigid support section.

4. In a closed car turning signal, a horizontal bar-like support adapted to extend from the front to the rear of an automobile window frame, said support having a straight upper edge to engage the upper part of the frame and a straight lower edge to abut the upper end of the window, said support comprising three abutting longitudinal sections, the intermediate section being rigid and the others flexible, said sections having alined longitudinal bores and the rigid section being provided with a recess between its ends into which its bores open, anchoring rods slidably received in said bores and having their inner ends received in said recess, the outer ends of said rods projecting beyond the ends of the support to engage the vertical window-guiding grooves of the frame, set screws threaded in said rigid section and abuttitng said rods to lock the latter in position, and a signal member mounted on said rigid support section.

5. A structure as specified in claim 2; the lower edges of said support sections having grooves to receive the upper end of the window, said rigid section being provided with a longitudinal downwardly projecting flange to lie against the outer side of the window, thereby bracing the support against tilting when the signal member is extended.

In testimony whereof I affix my signature.

ARTHUR H. ELLIS.